July 19, 1955 E. F. CHANDLER 2,713,253
APPARATUS FOR MAKING ICE CREAM
Filed Jan. 30, 1950
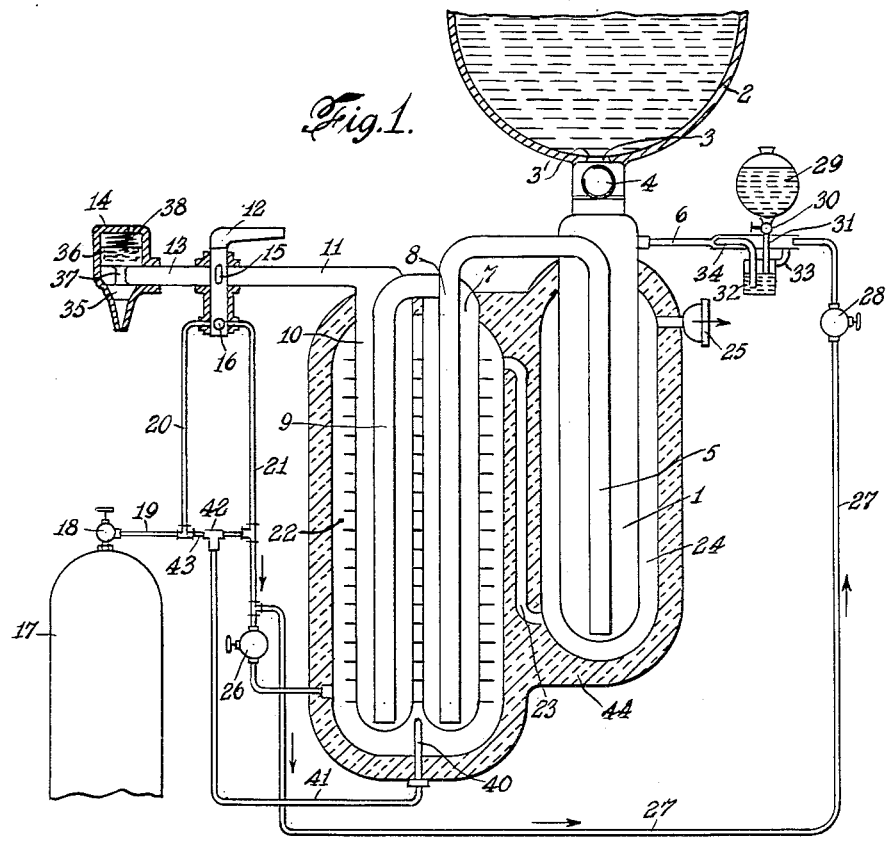
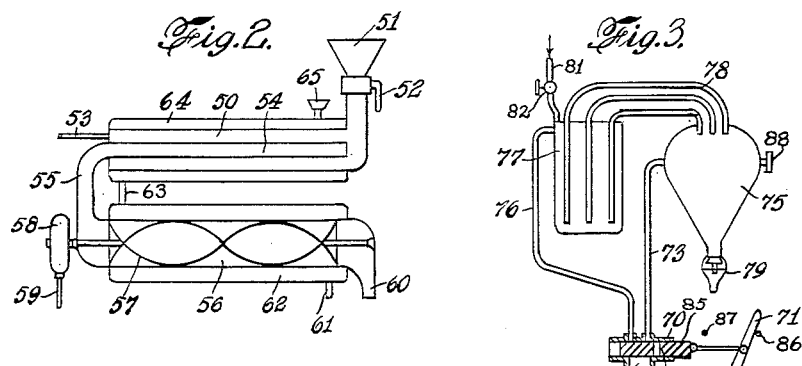
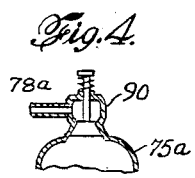
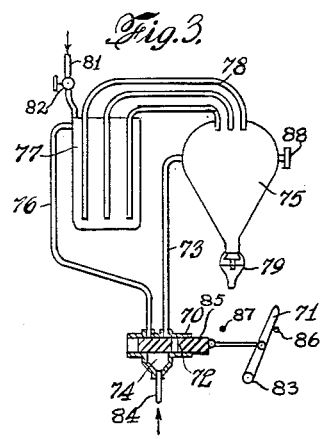
INVENTOR.
EDWARD F. CHANDLER
By Peter Fried, Jr.
ATTORNEY

United States Patent Office 2,713,253
Patented July 19, 1955

2,713,253

APPARATUS FOR MAKING ICE CREAM

Edward F. Chandler, Brooklyn, N. Y., assignor of one-third to Peter Fries, Jr., New York, N. Y.

Application January 30, 1950, Serial No. 141,324

1 Claim. (Cl. 62—114)

This invention relates to the making of cold food products including ice cream, and apparatus therefor.

An object of the invention is to provide a method and apparatus for the rapid, practically instantaneous preparation of ice cream, soft ice cream, frozen custard, and other cold food products.

Another object of the invention is to provide a method and apparatus for quickly and economically producing and delivering products of the type mentioned herein, in predetermined, unit quantities as desired, or as a continuous fluid flow.

A further object of the invention is to provide an apparatus for the making of cold food products, which is simple in design, inexpensive to manufacture, and which is economical and efficient in operation, employing a minimum of parts.

Still another object of the invention is to provide an apparatus for making ice cream and other cold food products, which is operated substantially under the influence of fluid pressure, and in which complicated mechanical means, electric motors, compressors and the like, may be entirely or substantially entirely eliminated.

Another object of the invention is to provide a device of the type described, which is, or may be made, fully automatic, and in which the operating cycle, for the production of the finished cold or frozen product, may be initiated by the pressure of a push button or the actuation of a lever, either by the customer, or by a person tending the apparatus and will then automatically dispense the product made, either in one or more unit quantities, or in a continuous flow.

Still a further object of the invention is to provide a method and apparatus for the manufacture of ice cream and other frozen or cold products from a mix, which is characterized by the aeration of the mix by a gas, rather than the beating or stirring mechanically of the mix for this purpose, as is usually done, the gas being introduced into the mix at a controlled pressure.

Another object of the invention is to provide a method and apparatus for the manufacture of ice cream and other cold products from a mix, in which a gas under controlled pressure is introduced into the mix for aeration thereof and production of ice cream therefrom, and in which high pressure gas having the characteristics of carbon dioxide, and from the same source as the aerating gas, may be employed for producing the freezing temperature needed for the process.

Other objects and advantages of the invention will become apparent from the following description of a preferred embodiment thereof as illustrated in the accompanying drawings, forming a part hereof, and in which, Figure 1 illustrates diagrammatically and schematically, apparatus of one form, for carrying out the invention, portions of the parts being shown in sectional elevation to make clear their construction and arrangement.

Figure 2 shows a modified form of the invention, employing a rotatable stirring element.

Figure 3 shows a third modification of the invention, shown in schematic, partly sectioned form.

Figure 4 shows a modification of the form of the embodiment illustrated in Figure 3.

At present, in the class to which this invention more particularly pertains, machines are in common use for making ice cream, soft ice cream, or frozen custards and the like. These machines are in fact, complete, mechanically operated mixing and refrigerating units, equipped with electric motors for operating the same, and are complicated, expensive, difficult to keep clean and sanitary, and are expensive to maintain. In these machines, a hopper is provided into which the ice cream mix is poured, the mixing and freezing cycle is initiated to make ready the finished product which, when ready, is drawn off, through a suitable valve, to be served in any well known manner. These machines are heavy and bulky, are costly to handle and ship, and are not convenient to install, except where electric power, water and other service facilities are available.

It is a purpose of the present invention to provide a unit for the production of cold beverages or foods of the type mentioned, which is adapted to be more generally applicable for installation and use because of its simplicity of construction and installation, efficient operation, its low first cost and operating economy, and because substantially no service facilities are necessary on the premises, for its successful maintenance and operation.

The operation of the apparatus herein disclosed is predicated largely upon the use of fluid pressure, preferably stored fluid pressure, as the power source for actuating the operating cycle. For example, liquid carbon dioxide, at a pressure of one thousand pounds per square inch, and at normal room temperatures, when expanded under certain conditions, results approximately in half gas and half liquid at about —40 degrees Fahrenheit, about one half of the liquid changing into the solid or "Dry Ice" state. In the carrying out of the present invention, these factors of fluid pressure and low temperature are utilized for the treating, freezing, measuring the feed of, and delivering the completed product ready for consumption.

Preferably, the "mix" is delivered to the apparatus in a sealed, sanitary package or can. One or more containers of the ingredients or mix, may be placed in the magazine of the apparatus, and may be fed therefrom, by gravity or otherwise, one at a time, to the apparatus, as required.

When so delivered to the operating head of the apparatus, a can or container is hermetically sealed in position, then automatically or otherwise punctured in such manner as to allow the contents to start flowing to a suitable loading chamber of fixed or adjustable volumetric capacity, wherein, for example, the mix received therein may be thoroughly whipped, by the expansive action of some of the carbon dioxide gas being forced therethrough in a well known manner, and, in the same chamber or in a subsequent zone, the whipped or prepared mix may be suitably chilled or frozen by the low temperature resulting from the expansion of the carbon dioxide gas. Obviously, the mix may be converted to a charge of ice cream and delivered as such in measured quantity, or, the operation may be continuous, the ice cream in semi-fluid form being delivered as a stream from a suitable tap or valve, which may be automatically or manually opened or closed as desired.

The so-called "ice cream mix," well known in the trade and incorporating the ingredients for making the ice cream, as usually found on the market, is commonly of neutral flavor. Accordingly, where it is desirable to be able to dispense products having various flavors from one unit apparatus, this may be simply accomplished by my invention, by providing a plurality of charge or mix treating chambers, to any of which the fluid mix material in the can or container, operatively in position in the apparatus, may be shunted, as for example, by the operator pressing a suitable push button, preferably marked with the name of the flavor desired.

By the same means, for example, any desired one of a plurality of flavoring extracts, may be released in measured quantity, and blended into the mix then under preparation so as to give the same the desired taste or flavor. Carbon dioxide, in liquid form and under relatively high pressure, is sold commercially in conveniently handled flasks. In the simplest form of my apparatus, one of such flasks would be operatively connected thereto in readiness to supply fluid pressure to the unit for operating the cycle when the same is initiated, as for example, by pushing the starting button, to obtain from the apparatus a serving of its product.

Preferably, however, a plurality of carbon dioxide flasks may be connected at one time to a supply manifold for fluid pressure on the apparatus, and so valved that as one flask becomes exhausted, another full flask goes into operation and is properly connected to supply the fluid pressure. In this manner, as will be appreciated, the apparatus may be used over longer periods of time without interruption of service. Also, under this arrangement, emptied flasks of carbon dioxide gas may be replaced at any time without interrupting the supply of fluid pressure by the full flasks.

The apparatus may easily be cleaned by allowing steam or hot water to flow therethrough, suitable means being provided to drain all portions thereof.

In order to understand clearly the nature of the invention, and the best means for carrying it out, reference may now be had to the drawings, in which like numerals denote similar parts throughout the several views.

As seen in Figure 1, there is a loading chamber 1 which is adapted to be filled by a fluid cream mix, that is, the ingredients for producing the ice cream or other cold food product, the mix being contained in a container 2. From this container 2, the mix may flow by gravity through the port 3, past the ball check valve 4 and into the chamber 1. Container 2 is shown as being filled with the mix. Positioned within the chamber 1, is a suitable pipe 5 having its inlet opening near the bottom of the chamber.

By means of pipe 6, a stream of suitable gas under pressure may be admitted to chamber 1, an example of a suitable gas being carbon dioxide gas. The effect of admission of the gas into chamber 1 is to force the ball check 4 upwards against its valve seat 3', thereby closing the port 3, and causing the gas to mix with and drive the contents of the loading chamber 1 out through pipe 5 after aeration thereof by the gas. By this means, the material forced out through pipe 5 is thoroughly whipped and aerated, and in this agitated state is delivered into chamber 7 through pipe 8, which may be an extension of the pipe 5.

Further expansion of the pressurized gas and its admixture in chamber 7 with the flowing mass continues the whipping action as the said mass is driven out of chamber 7 through pipe 9, which in turn leads into chamber 10, which may be provided with an outlet pipe 11 equipped with the valve 12. Beyond the valve and connected therewith, as by pipe 13, is a suitable non-drip tap 14. Valve 12 is provided with a suitable port opening 15 for controlling the flow of the product from the apparatus.

The valve is also equipped with port opening 16. A flask 17 contains liquid carbon dioxide, the pressurized gas from which may be made available by opening the valve 18. Pipes 19 and 20 convey the gas to the valve 12, and when this valve is opened the gas is permitted to flow through pipe 21 and into the expansion chamber 22, the expanding gas passing on through pipe 23 into chamber 24, and out through a suitable gas flow restricting device 25.

A suitable governing valve 26, adjustable or pre-set, may be inserted in the pipe line 21 for controlling the gas pressure flow from the flask 17. A branch pipe 27, leading from pipe 21 is adapted to convey fluid pressure to chamber 1 through inlet pipe 6. In pipe 27, a suitable governing valve 28 may be provided for controlling the whipping and feeding pressure. A bowl 29 contains a suitable supply of fluid flavoring extract, and has a suitable check valve 30 in its outlet leading to pipe 31, which leads in turn to the measuring chamber 32, it being noted that the chamber 32 may be pressurized through pipe 33 which communicates with pipe 27.

A suitable atomizing pipe 34 is adapted to deliver the contents of chamber 32 into the gas stream to be carried thereby and mixed with the material in chamber 1 for the purpose of flavoring the same. The delivery tap 14 is provided with a valve member 35 having a piston 36 connected thereto by the neck 37, the valve 35 being normally held closed by the spring 38. Pressure of the product against the piston, which is larger in diameter than the valve, urges the valve from its seat. The fluid product is thus delivered under pressure from the tap, and a back-pressure, if desired, may be maintained on the system during the delivery operation.

In operating the system, the gas delivered from the flask 17 into the chamber 22 is expanded therein, causing Dry Ice to form, which acts to chill or freeze to a semi-liquid mass the product within the system or flowing therethrough, the low temperature fluid products of said expansion passing by means of pipe 23 into the cooling chamber 24 to be gradually released therefrom through the means 25 and escaping to atmosphere. Where it is desired to maintain a relatively constant low temperature within the system, a thermal responsive element 40 may be suitably positioned within a chamber, as for example chamber 22, and connected by means 41 with a valve 42 in the by-pass pipe 43, and so adjusted that when the temperature within the controlled zone rises above a predetermined degree, valve 42 is opened to permit gas to flow.

The gas exhaust device 25 may be equipped with a disc of felt, for example, through which the gas is obliged to pass, or a metal disc having suitable fine perforations may be employed. Suitable lagging or insulation 44 may be provided about the walls of the various chambers, and also the piping where needed. It is apparent that an important object is to whip the mix as it is moved through the unit, and preferably simultaneously chill and/or freeze the same. The extent to which the whipped mix is chilled will depend upon the temperature produced, and how long the mix is exposed thereto, which may be governed by the rate of travel and/or the length of the effective system.

In the schematic assembly thus far shown and described for Figure 1, no mechanical moving parts are employed, aside from the valves, the stored fluid pressure serving to feed the product, whip or aerate it, and advantage is taken of the drop in temperature caused by the expansion of the gas to chill or freeze the admixture before it is released from the apparatus as a semi-fluid food product or drink. However, it will be appreciated that where found desirable in applying the principle of the present invention, the fluid pressure may also be employed, in any suitable manner, as a motor actuating fluid, as for example, to drive loading, mixing, stirring, feeding and such operating elements in a system of the type described herein.

As the supply of stored fluid pressure may be relatively limited, the use of some of it as a motor fluid may best be applied where the apparatus is operated only during brief periods, as for example, in the production of small batches of so-called soft ice cream, malted milk, frosted drinks and the like. Figure 2 shows schematically a system in which an element is rotated, the power being supplied by a suitable motor or turbine which is driven by a gas under pressure.

In Figure 2, there is a suitable loading chamber 50 which may be charged by gravity with a mix contained in the holder 51, a suitable valve 52 serving to close the chamber 50 and thus preventing pressurized gas from escaping up through the holder 51, during the operation of the cycle. Assuming that chamber 50 contains a charge of mix, carbon dioxide gas is admitted through pipe 53 into this chamber to mix with, expand therein to aerate and move the material or mix, forcing it through pipe 54 and by duct means 55 into the chilling and/or freezing chamber 56. In the latter chamber 56 there may be positioned a suitable helical stirring member 57 rotated by a motor 58 driven by fluid pressure delivered thereto by pipe 59 from a suitable source of fluid under pressure.

The rotary element 57 may serve to further beat the mix and expose the same to the cold wall of the chamber 56, while urging the same toward the outlet 60 from which the finished product issues. Pipe 61 admits gas into chamber 62, such for example as high pressure carbon dioxide in partly liquid state, where it expands and absorbs heat, the low temperature gas issuing through pipe 63 into chamber 64 to cool the same before escaping through outlet means 65 which, like element 25 in Figure 1, controls the rate of escape, and may be similar thereto.

Figure 3 illustrates a modification of the invention, in which there is a mix chamber 77 adapted to receive liquid ice cream mix from a container or other source through delivery pipe 81, the flow being controlled by means of the valve 82 as desired. High pressure carbon dioxide is supplied from a suitable source like the cylinder 17 of Figure 1, through delivery pipe 84, into the vestibule chamber 74 of the slide valve housing 70. A slide valve plunger 85 is movable in the valve housing 70, from left to right and back again, and has a communicating bore 72 extending therethrough. Gas outlet pipes 73 and 76 are connected at their lower ends with corresponding gas ports mutually spaced from each other, in the upper wall of the valve housing 70.

An actuating lever 71, pivoted at 83, is connected by a suitable rod to the plunger 85, so that when it is retracted to the right against stop pin 86 as seen in Figure 3, there is no flow of carbon dioxide from the valve 70. It is further to be noted that upon movement of the lever 71 toward the left, the communicating bore 72 first comes into registry with the inlet to pipe 73, allowing high pressure carbon dioxide to enter the freezing chamber or flask 75, and to expand therein, reducing the inside temperature therein to a very low level, far below freezing. Before moving the lever 71 from its full line position in Figure 3, the valve 82 has first been closed, the charge of ice cream mix having already been allowed to enter the mix chamber 77.

After the carbon dioxide has been allowed to enter the chamber 75 through pipe 73, the lever 71 is pushed all the way over to the left, against stop pin 87, bringing the communicating valve bore 72 into registry with the lower end of pipe 76, and allowing the high pressure carbon dioxide to flow through pipe 76 and into the mix chamber 77, agitating and aerating the ice cream mix therein. Under the influence of this high pressure, in chamber 77, the aerated and agitated, highly whipped mix is forced out of chamber 77 through the conducting pipes 78, and into the upper portion of the freezing chamber 75.

The relatively small diameter plurality of pipes 78 serves to finely divide the flowing mass of mix, so that it is readily frozen or chilled upon entering the cooled chamber 75. The valve means 88, which may be similar to means 25 shown in Figure 1, allows controlled leakage of any excess carbon dioxide gas from chamber 75 if considered desirable. At 79 is shown the discharge outlet for the frozen ice cream, and this may contain a valve of any suitable type, manually or automatically controlled to regulate the time and rate of discharge or dispensing of ice cream therefrom. The outlet valve at 79 may also be a spring loaded valve, normally closed, and which opens when there is sufficient pressure by the ice cream to overcome the spring force, to discharge some ice cream and then close again, the spring thus providing suitable back pressure as needed.

The discharge of ice cream would thus take place when the lever 71 is at its extreme left hand position against stop 87, when gas is flowing in pipe 76, ultimately forcing the mix into chamber 75 and raising the pressure therein. The lever 71 is then retracted to the right against stop 86, and the valve 81 is opened, allowing more mix to enter chamber 77 for another cycle of operation.

Instead of employing a plurality of small diameter pipes 78 to break up the stream of agitated and aerated mix so that it will more readily freeze on entering the cold chamber 75, the form shown in Figure 4 may be used. In that form, only one pipe 78a need be used to conduct the agitated and aerated mix from chamber 77 to chamber 75a which corresponds to chamber 75 of Figure 3. However, a spring loaded expansion type valve 90, normally closed, will open slightly under the pressure in pipe 78a, to provide an annular thin passageway over the valve seat for the mix to be sort of sprayed or atomized as it enters chamber 75a. Being thus finely divided, it is readily frozen on entering the cold chamber 75a.

Although I have described my invention in specific terms, it will be understood that various changes may be made in size, shape, materials and arrangement without departing from the spirit and scope of the invention as claimed.

I claim:

A device for producing cold food products in the nature of ice cream, frozen custard, chilled malt drinks, soft ice cream, and the like, comprising a housing having a first chamber formed therein, a source of cream mix including the ingredients of the product to be produced, first duct means connecting said cream mix source with said first chamber, first valve means disposed in said first duct means for regulating the flow of cream mix to said first chamber, a freezing chamber being formed in said housing, second duct means communicating between said first chamber and said freezing chamber, a source of liquid carbon dioxide gas, third duct means connecting said carbon dioxide source with said first chamber, second valve means disposed in said third duct means for regulating the flow of carbon dioxide to said first chamber, whereby, upon opening said first valve means a charge of said cream mix may be allowed to enter said first chamber, and whereby, upon opening said second valve means carbon dioxide under pressure is allowed to enter said first chamber and to agitate and whip said cream mix therein and to pressurize said first chamber, and whereby under the influence of said pressure from said gas, said whipped cream mix is forced through said second duct means and into said freezing chamber, fourth duct means connecting said source of liquid carbon dioxide with said freezing chamber, third valve means normally closed and disposed in said fourth duct means, whereby, upon opening said third valve means, the resultant flow of carbon dioxide into said freezing chamber and its expansion therein reduces the temperature of said whipped mix therein sufficiently to produce the desired food product, and normally closed dispensing means connected to said freezing chamber for dispensing the cold food product therefrom.

References Cited in the file of this patent

UNITED STATES PATENTS

| | | |
|---|---|---|
| 1,548,430 | Ashley | Aug. 4, 1925 |
| 1,889,236 | Burmeister | Nov. 29, 1932 |
| 1,933,257 | Goosmann | Oct. 31, 1933 |
| 1,965,836 | Heath | July 10, 1934 |
| 1,991,384 | Field | Feb. 19, 1935 |
| 2,000,730 | Wortmann | May 7, 1935 |
| 2,083,072 | Lindsey | June 8, 1937 |
| 2,131,510 | Gray et al. | Sept. 27, 1938 |
| 2,261,808 | Morris | Nov. 4, 1941 |
| 2,375,833 | Urquhart | May 15, 1945 |